(12) United States Patent
Adler et al.

(10) Patent No.: US 11,941,378 B1
(45) Date of Patent: Mar. 26, 2024

(54) SYSTEM AND METHOD FOR UTILIZING PRODUCTION INSIGHTS IN GENERATIVE AI MODELS

(71) Applicant: Hud Software Platforms Ltd., Tel Aviv (IL)

(72) Inventors: Roee Adler, Tel Aviv (IL); May Walter, Tel Aviv (IL); Shai Wininger, Kerem Maharal (IL)

(73) Assignee: Hud Software Platforms Ltd., Tel Aviv (IL)

( * ) Notice: Subject to any disclaimer, the term of this patent is extended or adjusted under 35 U.S.C. 154(b) by 0 days.

(21) Appl. No.: 18/381,935

(22) Filed: Oct. 19, 2023

(51) Int. Cl.
   G06F 8/35 (2018.01)
   G06F 8/33 (2018.01)
   G06F 8/71 (2018.01)

(52) U.S. Cl.
   CPC .............. G06F 8/35 (2013.01); G06F 8/33 (2013.01); G06F 8/71 (2013.01)

(58) Field of Classification Search
   CPC .............. G06F 8/33; G06F 8/35; G06F 8/71
   See application file for complete search history.

(56) References Cited

U.S. PATENT DOCUMENTS

| | | | | |
|---|---|---|---|---|
| 8,327,324 B1 * | 12/2012 | Gong | ............... | G06F 11/3624 717/110 |
| 8,930,914 B2 * | 1/2015 | Cohen | ............... | G06F 11/3452 717/130 |
| 10,817,604 B1 * | 10/2020 | Kimball | ............... | G06F 21/563 |
| 10,871,951 B2 * | 12/2020 | Ding | ............... | G06F 8/4435 |
| 11,748,072 B2 * | 9/2023 | Cappello | ............... | G06F 11/302 717/110 |
| 2007/0168984 A1 * | 7/2007 | Heishi | ............... | G06F 11/3624 717/124 |
| 2009/0276752 A1 * | 11/2009 | Sharma | ............... | G06F 8/20 717/103 |
| 2012/0117545 A1 * | 5/2012 | Yokoi | ............... | G06F 11/3684 717/126 |
| 2013/0263086 A1 * | 10/2013 | Carter | ............... | G06F 8/33 717/113 |
| 2015/0082277 A1 * | 3/2015 | Champlin-Scharff | ............... | G06F 11/3664 717/120 |
| 2019/0108001 A1 * | 4/2019 | Hauser | ............... | G06F 11/3668 |
| 2019/0146764 A1 * | 5/2019 | Ravindar | ............... | G06F 8/443 717/151 |
| 2021/0304142 A1 * | 9/2021 | Bar-on | ............... | G06Q 10/101 |

* cited by examiner

*Primary Examiner* — Douglas M Slachta
(74) *Attorney, Agent, or Firm* — Myers Wolin, LLC

(57) ABSTRACT

A production insight pertaining to a code element within a code base is obtained. The production insight is determined based on data derived from a live production environment. The live production environment hosts a computer program product that is an executable program that is based on the code base. The code base is automatically updated to include a text that conveys the production insight with respect to the code element in a human-readable manner, wherein the code base is updated to include the text in a manner that does not affect a functionality of the executable program. In response to a user instruction, a generative Artificial Intelligence (AI) model is invoked to generate an outcome. The generative AI model is configured to analyze the code base or portion thereof and is enabled to utilize the production insight.

21 Claims, 7 Drawing Sheets

FIG. 2

SYSTEM AND METHOD FOR UTILIZING PRODUCTION INSIGHTS IN GENERATIVE AI MODELS

TECHNICAL FIELD

The present disclosure relates to generative AI in general, and to utilizing production insights by a generative AI model, in particular.

BACKGROUND

In the realm of software development, there is a growing demand for innovative approaches to streamline and expedite the coding process. Software development has entered a new era with the emergence of Artificial Intelligence (AI), particularly generative AI models. These models have the potential to revolutionize the coding process. Some models can process source code and generate useful output based thereon. Generative AI technology may assist developers by producing code snippets, functions, or even entire programs based on specific requirements, instructions, or natural language inputs. While generative AI can automate the generation of human-readable source code for software applications, it is not necessarily limited to such type of output. Generative AI may process source code and output non-source code output, such as explanations about the code, technical specification, user manuals, or the like. Generative AI may leverage AI techniques, such as machine learning, deep learning, Large Language Models (LLMs), or the like, to understand and interpret code snippets, functions, or even complete software programs, and produce useful output based thereon.

Generative AI is a valuable tool in modern software development, streamlining coding processes, reducing human errors, and accelerating software development projects. It augments the capabilities of developers and holds the potential to improve code quality and consistency across projects. Rather than replacing human expertise, it assists developers in various ways, such as offering intelligent code completion, error detection, and even translating natural language descriptions into functional code, and vice versa.

BRIEF SUMMARY

One exemplary embodiment of the disclosed subject matter is a method comprising: obtaining, by a software agent, a production insight pertaining to a code element within a code base, the production insight is determined based on data derived from a live production environment, wherein the live production environment hosts a computer program product that is an executable program that is based on the code base or portion thereof; automatically updating, by the software agent, the code base to include a text that conveys the production insight with respect to the code element in a human-readable manner, wherein the code base is updated to include the text in a manner that does not affect a functionality of the executable program; and in response to a user instruction, invoking a generative Artificial Intelligence (AI) model to generate an outcome, whereby the generative AI model is configured to analyze the code base or portion thereof and is enabled to utilize the production insight, whereby the generative AI model is informed of the production insight without having an Application Programming Interface (API) with the software agent.

Another exemplary embodiment of the disclosed subject matter is a system comprising: a production insight engine, wherein said production insight engine is deployed at a live production environment, said production insight engine is configured to derive a production insight pertaining to a code element within a code base, the production insight is determined based on data derived from the live production environment, wherein the live production environment hosts a computer program product that is an executable program that is based on the code base or portion thereof; a software agent that is deployed on a client device, said software agent is configured to automatically update the code base to include a text that conveys the production insight with respect to the code element in a human-readable manner, wherein the code base is updated to include the text in a manner that does not affect a functionality of the executable program; and a generative Artificial Intelligence (AI) model, said generative AI model is configured to generate an outcome in response to a user instruction, wherein the generative AI model is configured to analyze the code base or portion thereof and is enabled to utilize the production insight for generating the outcome, whereby the generative AI model is informed of the production insight without having an Application Programming Interface (API) with said software agent or with said production insight engine.

Yet another exemplary embodiment of the disclosed subject matter is a computer program product comprising a non-transitory computer readable medium retaining program instruction, which program instructions when read by a processor, cause the processor to: obtain a production insight pertaining to a code element within a code base, the production insight is determined based on data derived from a live production environment, wherein the live production environment hosts a computer program product that is an executable program that is based on the code base or portion thereof; automatically update the code base to include a text that conveys the production insight with respect to the code element in a human-readable manner, wherein the code base is updated to include the text in a manner that does not affect a functionality of the executable program; and in response to a user instruction, invoking a generative Artificial Intelligence (AI) model to generate an outcome, whereby the generative AI model is configured to analyze the code base or portion thereof and is enabled to utilize the production insight, whereby the generative AI model is informed of the production insight without utilizing an Application Programming Interface (API).

Optionally, the method of comprises: obtaining, by the software agent, a second production insight pertaining to the code element, the second production insight is determined based on second data that is derived from the live production environment earlier than a time at which the data is derived, the second production insight contradicts the production insight; and in response to said obtaining the second production insight, automatically updating the code base to include a second text that conveys the second production insight with respect to the code element in a human-readable manner; wherein said automatically updating the code base to include the text comprises updating the code base to remove the second text; whereby real-time up-to-date production insights are maintained in a human-readable manner within the code base.

Optionally, the software agent is configured to cause an Integrated Development Environment (IDE) to update the code base based on production insights made available thereto, whereby said automatically updating is performed by the IDE.

Optionally, the code element is a function, whereby production insights are provided in a function-level granularity.

Optionally, the production insight comprises at least one of: an error rate metric indicating an error rate of the code element when executed in the live production environment; an execution time metric indicating an execution time of the code element when executed in the live production environment; an invocation frequency metric indicating an invocation frequency of the code element in the live production environment; and a resource utilization metric indicating utilization of third-party resources by the code element when executed in the live production environment.

Optionally, the software agent is further configured to update the code base by including a second text pertaining to a second insight regarding the code element, wherein the second insight is a non-production insight.

Optionally, the software agent is further configured to update the code base by including a second text pertaining to a second insight regarding the code element, wherein the second insight is derived from a Version Control System (VCS) that is utilized by developers updating the code base.

Optionally, the text is inserted to the code base as a comment, wherein a compiler or interpreter processing the code base is configured to ignore the comment.

Optionally, the text is inserted to the code base in a separate textual file.

Optionally, said automatically updating comprises introducing a comment to the code base pointing to the separate textual file.

Optionally, said automatically updating comprises introducing a pre-processing directive instructing an inclusion of content of the separate textual file, the separate textual file is a dedicated code file including only comments that convey insights regarding code elements.

Optionally, the generative AI model is a Large Language Model (LLM).

Optionally, the generative AI model is invoked independently of software agent and without involvement thereof.

Optionally, the generative AI model is invoked to perform at least one of: generate a summary of the code element; debug the code base; code a new feature into the code base; update the code base to improve performance of the computer program product in the live production environment; and provide a suggestion regarding code optimization of the code base, performance improvement or debugging the code base.

Optionally, said obtaining the production insight comprises: obtaining from a logging tool information regarding execution of the computer program product, the logging tool is executed in the live production environment and is configured to monitor execution of the computer program product; deriving the production insight from the information obtained from the logging tool.

Optionally, the system comprises an Integrated Development Environment (IDE) that is utilized by a user using the client device, wherein said software agent is an IDE extension, whereby said automatically updating is performed by the IDE.

Optionally, the system comprises a Version Control System (VCS), said VCS is utilized by developers updating the code base, wherein said software agent is configured to update the code base by including a second text pertaining to a second insight regarding the code element, wherein the second insight is derived from said Version Control System (VCS).

Optionally, the text is inserted to the code base in a separate textual file, wherein said agent is configured to introduce a comment to the code base pointing to the separate textual file.

Optionally, said production insight engine comprises a logging tool, said logging tool is executed in the live production environment and is configured to monitor execution of the computer program product, wherein said production insight engine is configured to derive the production insight based on a log recorded by said logging tool.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 2 shows a schematic illustration of an IDE, in accordance with some exemplary embodiments of the disclosed subject matter.

DETAILED DESCRIPTION

Figure 1:
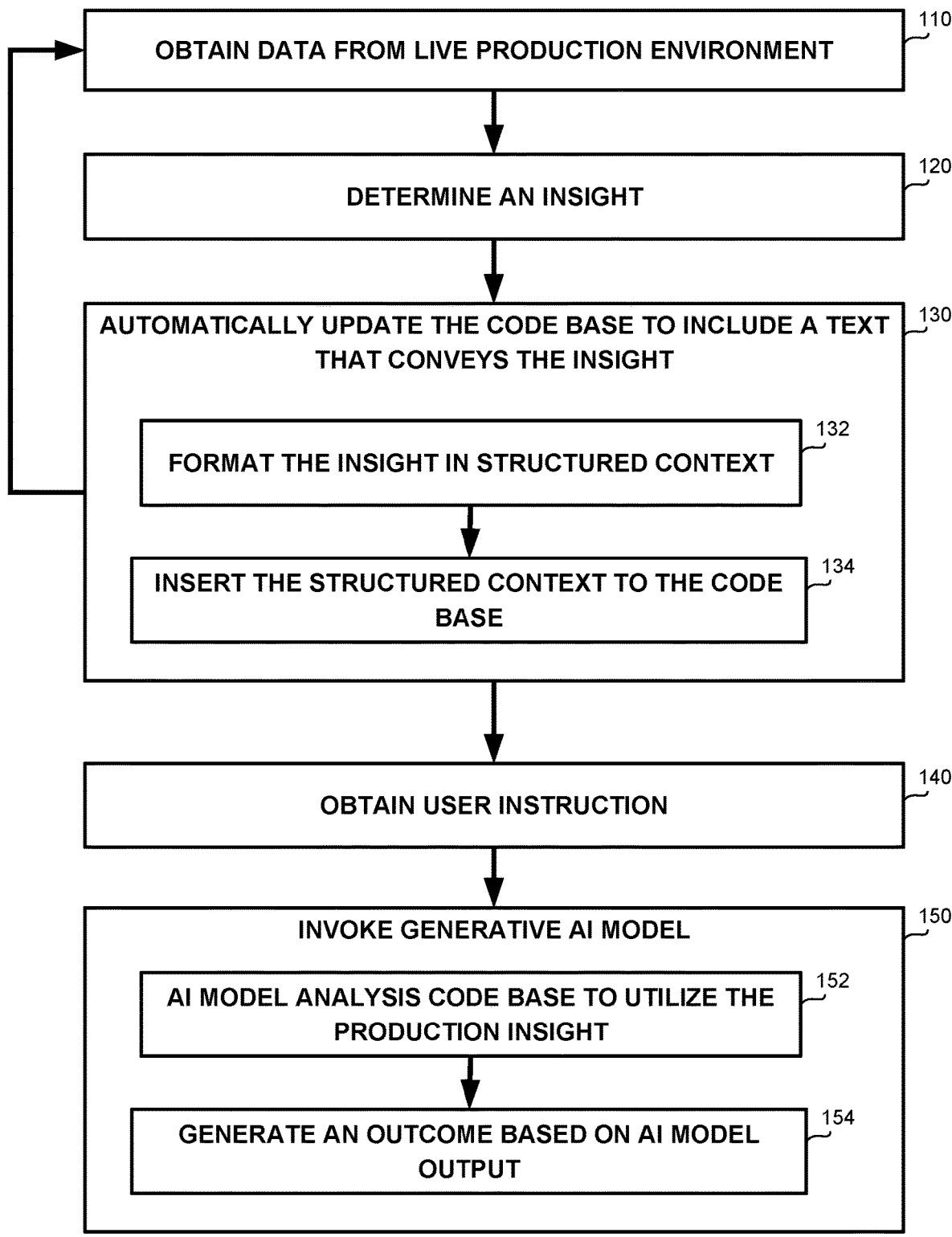
FIG. 1 shows a flowchart diagram of a method, in accordance with some exemplary embodiments of the disclosed subject matter.

One technical problem dealt with by the disclosed subject matter is integrating contextual data into code generation process without requiring Application Programming Interfaces (API) integration. Generative AI models have the capability to generate code and assist developers in various aspects of the software development lifecycle. However, to harness their full potential, it may be essential to provide these AI models with relevant contextual information about the relevant code base, its production environment, and other pertinent factors. Such integration may involve the use of textual information from various sources, including production environments, error logs, source code history, local environments of other engineers, Software as a Service (SaaS) logs, or the like, to provide context and insights to a generative AI engine when generating code. Typically, achieving this integration may require the establishment of complex APIs between software agents and AI models. Such an approach can be cumbersome, potentially compromising security, and often lacks real-time access to production data.

Another technical problem dealt with by the disclosed subject matter is the integration of generative AI technology into an Integrated Development Environment (IDE) without the need for a dedicated Application Programming Interface (API). Traditional approaches for utilizing a generative AI engine may typically require a dedicated API for interconnection therebetween. This poses challenges in collecting real-time, contextual data from various sources, including production environments, error logs, source code history, local engineer environments, SaaS logs, or the like.

Additionally, or alternatively, other challenges may be addressed by this technical problem. One challenge addressed by this technical problem may be with data collection and integration. Gathering data from diverse sources, such as different runtime environments, error logs, and code histories, and integrating it into a structured format that is comprehensible by the generative AI. Another challenge addressed by this technical problem may be creating contextual insights (e.g., structured context) from the collected data to provide meaningful insights into the code generation process. This context may be required to include information about the function's runtime environment, error history, cost implications, or the like. Yet another challenge addressed by this technical problem may be finding ways to automatically integrate this structured context into the coding environment of the IDE without requiring a dedicated API. This involves techniques like adding comments, file headers, or external files with instructions for the generative AI model. In particular, LLMs are configured to receive as input text-based files and process it for performing their function, and the added information may be provided to the LLM using the above manners. Yet another challenge addressed by this technical problem may be ensuring that the structured context is dynamically updated as new information becomes available. This may allow the generative AI model to adapt its provided output based on the latest insights, such as changes in production, error patterns, or engineers' activities. Yet another challenge addressed by this technical problem may be enabling the generative AI model to generate code that performs better and avoids introducing errors that could otherwise occur without the contextual information. Additionally, or alternatively, this may allow generative AI to provide better insights and related information based on the source code, such as providing warnings to developers about potential issues with the code base.

One technical solution is to automatically integrate textual information into code bases to be utilized by generative AI models, instead of a utilizing dedicated API. In some exemplary embodiments, a system that autonomously gathers real-time production insights related to specific code elements, such as functions, from a live production environment may be deployed. The system may be configured to derive a production insight pertaining to the code element within the code base, based on data from the production environments relevant to the code element, such as error logs, code history, local environments, SaaS logs, or the like. The insights may comprise real-time information from the production environment, such as information regarding performance, frequency, costs, error/exceptions, or the like.

It is noted that the disclosed subject matter may be utilized with respect to different granularity levels. One potential granularity level may be a function-level granularity, in which insights are provided for each function independently. Other granularity levels may be based on code blocks, classes, files, or the like. The present disclosure makes use of the function-level granularity for ease of description. However, the disclosed subject matter should not be construed to be limited to this specific granularity level, unless otherwise explicitly stated in the claims.

In some exemplary embodiments, the insights may be transformed into a structured context presented in a textual format that is understandable by generative AI models, such as LLMs, without the need for a dedicated API. The structured context may be updated dynamically as new information becomes available. The structured context may comprise human-readable text. The structured context may be integrated into the code base as comments, annotations, or the like, ensuring they do not disrupt the functionality of the code base and do not prevent its compilation. Additionally, or alternatively, the structured context may comprise a referral or an introduction to a textual file (compilable or non-compilable) that comprises the derived insights or other data that may assist the generative AI model in generating its outcome.

In some exemplary embodiments, users can trigger a generative AI model, configured to analyze the code, without necessitating an API connection with the software agent that compiles the insights. This approach empowers the AI model to utilize the production insights embedded in the code base, enhancing code generation while offering developers critical contextual information, all without relying on a dedicated API. It is noted that the generative AI model may be unaware of the existence of the software agent, and no integration may be required between the two components of the system. Hence, the users may use their AI model of choice, including proprietary and confidential models that are not available for the developer of the software agent, third-party models that were not available when the software agent was developed, or the like.

One technical effect of the disclosed subject may be enhancing code generation in an IDE by leveraging generative AI technology and contextual insights from various data sources, ultimately leading to more efficient and error-free code development. The disclosed subject matter enhances the development process by providing real-time context, improving code quality, and facilitating efficient collaboration between developers and AI models, all while eliminating the need for complex APIs.

Another technical effect of the disclosed subject may be improving real-time data integration. The disclosed subject matter allows for the integration of real-time production insights from diverse sources. This enables developers and the generative AI model to access up-to-date information about the code elements. Furthermore, the disclosed subject matter supports dynamic updates of the human-readable text based on various triggers, such as but not limited to changes that are identified in production environment, error occurrences, and developer activities. This ensures that the embedded insights remain relevant and current. Additionally, or alternatively, the disclosed subject matter enables the generation of alerts to inform users of potential consequences related to code changes. These alerts are based on production insights, helping users make informed decisions about code modifications.

Yet another technical effect of the disclosed subject may be enhancing code quality. By embedding human-readable text conveying production insights directly into the code base, developers and the generative AI model can make more informed decisions during code analysis, processing and generation. This may lead to code that performs better, has reduced number of errors, and takes into account various contextual factors, such as runtime environment and performance history.

Yet another technical effect of the disclosed subject may be eliminating the need for a dedicated API between the software agent and the generative AI model. This simplifies the integration process, reduces complexity, and ensures that the AI model can utilize the production insights without additional interface requirements. In some cases, this simplifies security-related issues, as the user invokes the AI model using his own credentials, and no API-specific credentials are required to be bestowed and maintained between the AI model and the software agent, as would be required in case of using a secured API.

Overall, the disclosed subject matter represents a significant advancement in the field of software development by simplifying the integration of production data into the code development process, enhancing code quality, and improving the efficiency of developers and Generative AI models. The elimination of API dependencies and the provision of real-time insights empower developers to create code that aligns seamlessly with production environments and user requirements.

The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Referring now to FIG. 1 showing a flowchart diagram of a method, in accordance with some exemplary embodiments of the disclosed subject matter.

On Step 110, data may be derived from a live production environment. The live production environment, also referred to as deployment environment, may be the set of computers where user-ready software is deployed and executed. The live product environment may be utilized to execute an executable software that was developed in the code base. In some exemplary embodiments, the executable software may be an outcome of a compilation process. The code base may be compiled (entirely or partially) to create the executable computer program product that is deployed to the production environment and executed thereon to be used by its intended users. It is noted that the compiled product that is being executed may be a single executable file or a set of executable files, that may be executed on a single computer, several computers, or the like. Additionally, or alternatively, the executable software may be developed using an interpreter-based language, such as Ruby™, Python™, JavaScript™, or the like. In such a case, the code base may not be compiled to obtain the executable software. Instead, the executable software may be the code base (or portion thereof) that is configured to be executed by an interpreter. It is noted that the disclosed subject matter is not limited to a specific executable manner and may be applied on compiled binary code, code executed by an interpreter, code executed by a two-pass interpreter, hybrid code comprising portions executed in different manners, or the like.

In some cases, the live production environment may host the final version of the software. However, in some cases, their deployed program may not be a finished version, but may be a version that is considered sufficiently stable, that had underwent sufficient testing and quality assurance efforts, before being deployed in the live production environment. In some exemplary embodiments, the live production environment may be an on-premise platform, a cloud-based platform, or combination thereof, or the like. The live production environment may be in different containerized scenarios, such as no containers environment, dockerized environment, Kubernetes environment, or the like.

In some exemplary embodiments, the live production environment may be distinguished from the testing or development environment, in which testing of the software may be performed until a version is developed and deployed to the live production environment.

In some exemplary embodiments, the data may be obtained by monitoring the execution of the computer product in the live production environment. The data may be production data that is derived from the live production environment, such as performance metrics, system frequency information, cost analysis results, error reports, exception logs, version updates and reverts in production, or the like. For example, the data may include a number of times a function was executed in the live production environment, a number of times the function was executed during a timeframe, a number of invocations of a third-party SaaS service, a cost of the invocations of the third-party SaaS service during a timeframe, a resource utilization of the function when executed during a timeframe, a log of errors that were caused by the execution of the function during a timeframe, or the like.

In some exemplary embodiments, the data may comprise information from a logging tool, regarding execution of the computer program product. The logging tool may be executed in the live production environment and may be configured to monitor the execution of the computer program product. As an example, the data may comprise information from error logs, such as information about common production errors, recent error occurrences related to the execution of a certain function, or any other type of data helping in identifying and understanding error patterns. As another example, the data may comprise information from SaaS logs about interactions with third-party SaaS platforms, such as the frequency and extent of service usage, or the like.

In some exemplary embodiments, the data may be collected at a granular level, focusing on individual code elements within the source code. Specific data points may be associated with particular functions contained within code files. This function-level granularity provides a high degree of precision and context when working with the collected data. As an example, the data associated with a certain function may comprise function execution locations. For each function in the code base, information about where the function runs may be gathered, along with details about the executables or services in which the function is executed. As another example, the data associated with a certain function may comprise server information including where each function is deployed, information about the utilization of these servers, whether they are operating near their capacity limits, or the like. It is noted that the server information may relate to physical servers, virtual servers, servers operating in a serverless environment, or the like. As yet another example, the data associated with a certain function may comprise invocation rate of the function, e.g., the frequency at which each function is invoked within the various workloads is tracked. As yet another example, the data associated with a certain function may comprise cost analysis of the function, such as data related to the cost of running each function, insights into the financial implications of function execution, or the like. As yet another example, the data associated with a certain function may comprise performance metrics of the function, such as the duration it takes for each function to complete its execution, whether the performance of the monitored function has been deteriorating over time, which may be crucial for identifying potential performance bottlenecks and related insights. As yet another example, the data associated with a certain function may comprise error information, such as which exceptions are thrown by the function, the rate of errors occurring when the function is executed, or the like. As yet another example, the data associated with a certain function may comprise function version reversions that occurred following increases in errors in production. It is noted that updates and reversions of versions in production may be considered a production issue. A function that is updated in production and malfunctions (e.g., throws exceptions at an unusually high rate) may be reverted back in the production environment. Such reversion of the function may not be tracked in the development environment, and may not necessarily be reflected in the code base management system (e.g., GitHub™). However, such information may be useful to derive insights regarding the operation of the function. For example, an LLM attempting to generate more code that interconnects with such function could utilize the insight of an erroneous version that malfunctioned, so as to improve the generated code. As yet another example, the data associated with a certain function may comprise Cross-Service and Cross-Repository interactions. A mapping of services may be performed to identify interactions between services. The mapping may be configured to track which other services invoke a particular service, whether code from the same repository interacts with the service, whether code from different repositories interacts with it, or if there are completely external invocations. The mapping may be configured to assist in establishing the relationships and dependencies between various code elements and services.

On Step 120, an insight pertaining to a code element within a code base may be determined based on the data obtained on Step 110. In some exemplary embodiments, the insight may be a production insight derived from the information obtained from the production environment, the logging tool or other resources. The insight may be useful provide generative AI models (such as LLMs) with contextual information, enabling such tools to make more informed decisions regarding the code base. The insight may be useful to empower the tools to identify potential consequences of the code elements that would otherwise remain hidden, such as detecting and alerting users to the possible impacts of code changes on performance, costs, error rates, or other critical factors, thereby enhancing code quality and decision-making.

It is noted that some insights may be determined based on non-production data. For example, insights may be derived from source code history, such as details about the history of code changes made to functions, changes correlated with the introduction or resolution of production errors, or the like. As another example, the insight may be determined based on data obtained from the development environment, from IDEs, or the like. As yet another example, the data may comprise current activities and changes taking place in the local development environments of other engineers working on the same code base.

In some exemplary embodiments, the insight may be determined by a server, a cluster of servers, a cloud-based server, or the like. In some cases, insights may be determined by a software agent at a central entity and be distributed to software agents that operate on client devices to be utilized thereby. In some cases, the utilization of the insights may be performed by the software agent at the central entity.

As an example, and without loss of generality, software agents may be deployed on client devices. The software agents may be integrated and operate within an IDE. For example, the software agent may be implemented (in whole or in part) as an IDE extension, an IDE plugin, or the like. In another example, the software agent may be deployed at a service, and may not be integrated with any IDE. Instead, the software agent may be configured to update, from the central entity, the code base, such as using a "ghost" account, using a plugin or API of the relevant system (e.g., GitHub™ plugin), or the like.

The determination of the insight may be performed by computing a pre-defined metric (e.g., computing a number of invocations identified by a logging tool during a timeframe). Additionally, or alternatively, some insights may be determined using AI tools, such as an LLM, that may receive a prompt that includes the production data and a request to determine and produce the insight.

In some exemplary embodiments, the insight pertaining to the code element may be determined in a function-level granularity, e.g., related to a certain function, a portion thereof, a set of related functions, or the like. The insight may be a production insight, such as an error rate metric indicating an error rate of the code element (e.g., the function) when executed in the live production environment, an execution time metric indicating an execution time of the code element when executed in the live production environment, an invocation frequency metric indicating an invocation frequency of the code element in the live production environment, a resource utilization metric indicating utilization of third-party resources by the code element when executed in the live production environment, or the like Additionally, or alternatively, the insight may be a non-production insight, enabling software development teams improve their processes, collaboration, and code quality, ultimately leading to more efficient and effective software development practices. The non-production insights may comprise insights related to code review feedback from team members or peers, including suggestions for improvement, code style adherence, best practices, or the like; insights about the efficiency of the development workflow, such as the time taken to complete specific development tasks, bottlenecks in the process, opportunities for optimization, or the like. Additionally, or alternatively, non-production insights may comprise insights on code complexity trends over time, insights regarding resource utilization of development resources, such as hardware, software licenses, or cloud resources, and recommendations for optimizing resource allocation.

Additionally, or alternatively, the insight may be derived from a Version Control System (VCS) or any other software configuration management system that is utilized by developers when updating the code base. The data for these insights may be collected directly from the VCS used by the development team. The VCS may keep a detailed record of all code changes, which can be analyzed to extract meaningful insights into the development process.

In some exemplary embodiments, VCS such as, Git™, SVN™, Mercurial™, or the like, may be used by development teams to manage changes to the code base, track the history of modifications, and enable collaboration among team members. Such systems may be configured to record every change made to the code base, including who made the change, when it was made, and the nature of the change (e.g., code additions, deletions, modifications). Insights derived from VCS may offer a window into the collaborative and iterative nature of software development, enabling teams to assess their workflows, identify areas for improvement, and ensure that code changes are effectively managed throughout the development lifecycle. Insights derived from VCS activity can provide valuable information to development teams and project managers, helping them understand the dynamics of code changes and the health of the development process. The VCS insight may comprise insights about frequency of commits (how frequently developers are committing changes to the version control system, periods of intense development activity or identify times when development has slowed down, or the like); insights about branching patterns (when new branches are created, merged, or abandoned, providing visibility into feature development or bug-fixing efforts); code review metrics; conflict resolutions; identities of original developers of code elements; identities of contributors to code elements; identifying code elements that were developed by staff members that are have been identified to be associated with specific types of bugs; or the like.

On Step 130, the code base may be automatically updated to include a text that conveys the production insight with respect to the code element in a human-readable manner. In some exemplary embodiments, the code base may be updated by the software agent providing the production insight. Additionally, or alternatively, the code base may be updated at a central entity. The code base may be updated to include the text in a manner that does not affect a functionality of a compiled outcome of the code base or portion thereof.

On Step 132, the insight may be formatted as a structured context. In some exemplary embodiments, the insight may be determined in Step 120 in a textual format, or may be later formatted as a structured text, in a predetermined structure, such as a comment, an indication, or the like. Additionally, or alternatively, the structured context may be created for each function based on one or more insights pertaining to the function. As an example, the Structured Context may be a concatenation of multiple interpretations in multiple insights.

In some exemplary embodiments, the structured context may be formatted based on the type of the insights: production environment context, error logs and source code history insights, local environments of other engineers and their IDEs insights, SaaS logs insights, or the like. As an example, if a function doesn't run in production at all, the production environments structured context may be "function [func_name] does not run in production, so there's no use in altering it unless the change includes explicitly calling it from another function". If the function runs in a workload that is close to capacity, the production environments structured context may be "function [func_name] is running on a server that is close to its compute capacity. Any code change that will significantly increase it's amount of invocations must take it into consideration, and either alert the user that it may cause a server slowdown, or attempt to avoid over-invoking it". If a function is expensive to run (e.g., it's resource utilization metric is above a predetermine threshold), the production environments structured context may be "function [func_name] costs on average $/day, so before making any change that will significantly increase how many times it's called, alert the user of the expected change in cost, or attempt to avoid over-invoking it". If code that is not in the repository covered by the generative AI model that is invoking the function, the production environments structured context may be "function [func_name] is invoked by code not in this repository. Either take all code in repository [repository name] into account, or avoid changing the interface of the function, or alert the user of any change to the interface".

As another example, if a function currently has many production errors of a certain kind, the error logs and source code history structured context may be "function [func_name] currently has many errors of kind "[error data]" in production, please attempt to resolve those or at least to not make them worse". If a function has many production errors of a certain kind that recently were resolved (so now it does not have errors in production), the error logs and source code history structured context may be "function [func_name] previously had many errors of kind "[error data]" in production, make sure that any change done to it won't revive these errors". If a code change can be correlated with the introduction of an error to production (that has since gone away), the error logs and source code history structured context may be "function [func_name] previously had a code change from [before] to [after] that resulted in errors of kind "[error data]"—take this into account when changing this function and avoid reintroduction of these errors". As yet another example, if a function is currently edited by an engineer in their local environment, the local environments of other engineers and their IDEs structured context may be "function [func_name] is currently being edited in another branch; so either avoid changing it until the change is merged, or take into account that the current change to is as follows: [updated code in the edited branch], or alert the user of that fact". As yet another example, if a function calls an external SaaS service, in particular one that bills on usage base, SaaS Logs structured context may be "function [func_name] calls 3rd party service [service name] which bills by usage, so either avoid increasing its rate of calls, or alert the user". A list of SaaS services may be maintained and made accessible by the generative AI model.

On Step 134, the structured context (or any other text conveying the insight) may be inserted to the code base. In some exemplary embodiments, the code base may be updated at a central entity, such as without being attributed to a user account of a developer. For example, the code base may be updated using a dedicated account for the service, e.g., a "ghost" account. As another example, a VCS plugin or API of the VCS may be utilized to gain access to the VCS repository, such as in case of a GitHub™ plugin that enables accessing and modifying the GitHub™ repository. Additionally, or alternatively, the code base may be updated by one or more software agents. In some cases, the software agent may cause the IDE to update the code base based on insights made available thereto. The software agent may be configured to automate the process of integrating production-related information into the code base without requiring manual intervention by developers. In some exemplary embodiments, a location, a technique and a timing of inserting the structured content may be determined to ensure that the generative AI model automatically takes them into consideration without requiring any integration via an API or other mechanisms. The placement of structured context within the code base may be strategically planned to make it accessible to, while minimizing disruptions, the code base management system, such as in comments, headers, designated resources, non-code files in the VCS repository, local files that are accessible by the generative AI model, dedicated code-files generated solely for holding comments that are accessible by the generative AI model, webpages accessible to the generative AI model, or the like.

In some exemplary embodiments, the structured context or the text conveying the insight may be inserted to the code base as a comment, which may be ignored by the compiler when compiling the code base. As an example, the entire structured context may be planted as a separate comment positioned above the relevant function, making it readily visible to developers reviewing the code. As another example, a subset of the structured context may be included in the comments, along with instructions guiding the generative AI model to locate the remaining context in a different non-code file within the code base repository, specifying either a local file address or a folder/file address, or to retrieve it from a URL as needed.

Additionally, or alternatively, the text may be inserted to the code base in a separate textual file. In such a case, a comment pointing to the separate textual file may be introduced to the code base, indicating a relevant insight is added in the file. The separate textual file may be a non-code file, such as a text file resource within the code base (e.g., README or LICENSE files). In another example, the separate textual file may be a code file that is used to hold comments that augment the code base with insight information. For example, a dedicated code-file that holds the insight information regarding function my_func defined in a file named "my_code.c" may be a file named "my_func_insights.c" and hold non-executable lines, such as comments, with the insight information. In the my_code.c file, in proximity to the my_func definition or declaration, there may be an #include instruction to include the content of the "my_func_insights.c" file, thereby introducing the insights into the code base using a pre-processing directive. As another example, a dedicated comments file for the entire code repository, a single file per folder or per set of folders may be utilized. It is noted that aggregating many comments in a single file may reduce the number of changes in the VCS that are needed when new insights are obtained, thereby improving overall performance of the system.

Additionally, or alternatively, the comments may be placed within a comment near the headers to indicate the presence of additional context stored either in a separate file within the code base repository or accessible via a link, a path, a URL, or the like. As an example, for comprehensive coverage, the entire structured context may be inserted in a file within the code base repository, such as in a README file, in a LICENESE file, or the like. This file can be scanned by LLMs, and its contents are made available to them for analysis and consideration regarding code generation. In some exemplary embodiments, one file may include information about several functions. Additionally, or alternatively, information about each function may be included in a different file.

In some exemplary embodiments, a software agent implemented at the user's IDE may be configured to display the insights as if they are presented in the code itself. In some cases, contextual information interspersed within the code may be presented visually to the user instead of, or in addition to the text that is added to the code base. In some exemplary embodiments, the text that is inserted to the code base, which is readable to the LLM, may be visually replaced by the software agent with the content of the file it points to, or to the relevant information to the function in such file.

Additionally, or alternatively, the text may be inserted to the code base in external files that may be downloaded and stored locally on the engineer's machine, whether it is a physical or virtual environment. The code base includes references or links to these files, facilitating access to additional context. These files allow for a decentralized approach to managing the context data, avoiding the need for frequent versioning or merging within the code base management system. Additionally, or alternatively, the text may be inserted to the code base into web pages. To provide flexibility, web pages accessible to LLMs are created to host structured content. These web pages are designed to serve specific functions or accommodate the entire repository of functions, allowing LLMs to access the required context. Accessible links with unique tokens may be planted within the code base, either as comments above functions, comments at the code file level, or references within a file in the code base. These links enable the generative AI models to retrieve the necessary data from the web pages as part of the code generation process.

In some exemplary embodiments, the structured context or any other the text conveying the insight may be planted in the code base by the software agent or by a central entity. As an example, the structured context may be planted from an IDE plugin, such as by inserting or editing comments both above the function and at the code file header, as well as planting non-code files in the repository. As another example, the structured context may be planted using a code base management plugin, such as Github™. As yet another example, the structured context may be planted using a code base management daemon. A "ghost" user may be created in the code base management system (e.g. Github™) that upon needing to plant structured context will automatically branch, plant/edit comments or non-code files, and merge back (which will be a safe operation because no code was changed).

It may be noted that real-time up-to-date production insights are maintained in a human-readable manner within the code base. When a production insight pertaining to a code element contradicts a previous production insight pertaining or relating thereto, the code base may be automatically updated to include a new text that conveys the new production insight with respect to the code element in a human-readable manner, and removing the text conveying the previous production insight. Additionally, or alternatively, an existing text may be automatically updated or amended to convey the production insight or the change thereof.

In some exemplary embodiments, Steps 110-130 may be repeated to maintain the code base updated. The timing of inserting the structured content (e.g., planting) may thoughtfully be determined, taking into account the intricacies of the code base and the development environment. Given the complexities of managing large code bases, the implementation approach may vary depending on specific considerations within a particular environment. In certain scenarios, it may be desirable to have fully verbose real-time updates of the structured contexts. This means that the structured context may be continuously updated and integrated into the code base as soon as relevant changes or insights become available. Real-time updates ensure that the code base is always synchronized with the latest contextual information, such as changes in production-related factors (invocations, duration, cost) or the emergence of new errors.

Additionally, or alternatively, in environments where constant changes to code comments are undesirable or disruptive, the insertion of structured content may occur only upon specific triggers. These triggers may carefully be chosen and serve as signals for when updates are necessary to reflect the most current insights. The triggers may include: major production changes, emergence of errors, resolution of errors, engineer activity, or the like. As an example, when there is a significant alteration in production-related factors, such as a notable shift in function invocations, duration, or cost, (e.g., change of over a predetermined threshold, which may be a relative threshold or an absolute threshold) the structured context is updated to align with the new circumstances. As another example, when a new wave of errors is detected in the production environment, this signals the need for updated context. The structured content is adjusted to account for the presence of these errors and their potential impact. Conversely, when a group of errors disappears or is resolved, this change is recognized as a trigger. The structured context is updated to reflect the improved state of the code. As yet another example, when an engineer begins editing a function in their Integrated Development Environment (IDE), this action triggers the insertion of structured context. The context can guide the engineer based on their ongoing changes and intentions. Additionally, or alternatively, the trigger may also be periodic trigger. For example, changes may be updated every one hour, two hours, 24 hours, 5 days, or the like. In some cases, the period of time may be reset if and when another trigger occurs with respect to the relevant code element. Such an embodiment ensures that all changes are planted within the maximal predefined period of time, on the one hand, and on the other, that important information is planted earlier on.

On Step 140, a user instruction for invoking a generative AI model, such as an LLM for generating code, may be obtained. The user instruction may specify a request or a task for the generative AI model to perform, such as generating a specific piece of code, summarizing code, debugging, adding a new feature, optimizing code, providing suggestions for code improvement, or the like. The user instruction may be provided using natural language. The user instruction may be a prompt, a query, a description of the desired outcome related to code generation, or the like. Users may be enabled to submit or send instruction to generative AI model, through an integrated IDE, a command line interface, a web application, or any other interface that allows interaction with the generative AI model.

On Step 150, a generative AI model may be invoked in accordance with the user instruction. It may be noted that the generative AI model may be invoked independently of software agent and without involvement thereof.

On Step 152, the code base or portion thereof may be analyzed by the generative AI model, to understand the context, intent, specifics of the user's request, or the like. The generative AI model may be configured to processes the instruction using its trained algorithms and patterns learned during training. As an example, the generative AI model may be invoked to generate a summary of the code element. Additionally, or alternatively, the generative AI model may be invoked to debug the code base. Additionally, or alternatively, the generative AI model may be invoked to code a new feature into the code base. Additionally, or alternatively, the generative AI model may be invoked to update the code base to improve performance of the computer program product in the live production environment. Additionally, or alternatively, the generative AI model may be invoked to provide a suggestion regarding code optimization of the code base, performance improvement or debugging the code base.

On Step 154, an outcome may be generated by the generative AI model. In some exemplary embodiments, the generative AI model may be configured to utilize the production insight to generate the outcome. The outcome may be generated based on the analysis of the instruction, the code base and the associated insights.

It may be noted that the generative AI model is informed of the production insight without having an API with the software agent.

Figure 2:
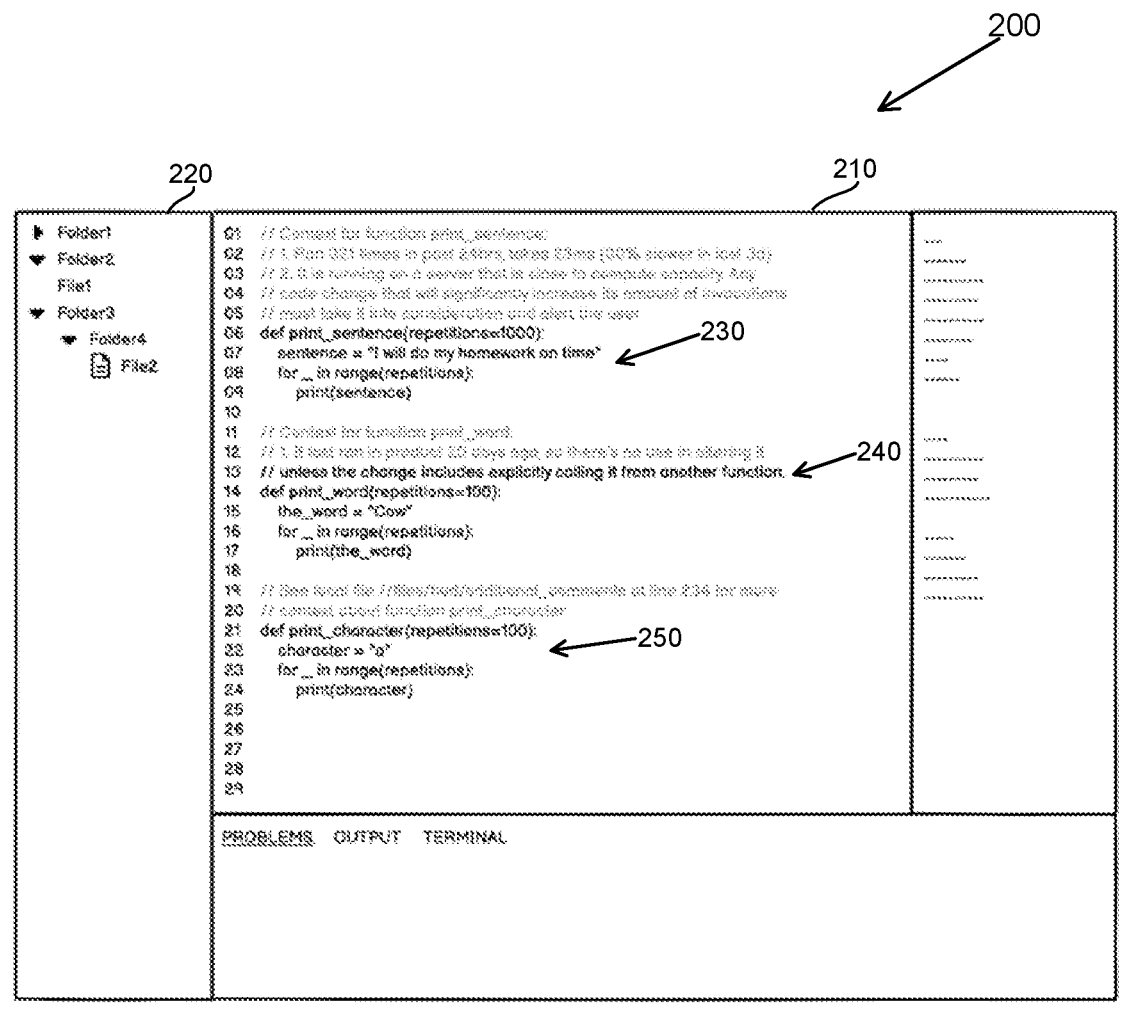

Referring now to FIG. 2 showing a schematic illustration of an IDE, in accordance with some exemplary embodiments of the disclosed subject matter.

IDE 200 may be a GUI utilized by a developer to develop code. IDE 200 may be utilized to show code to the developer, allow the developer to update the code, or the like. IDE 200

IDE 200 show cases different embodiments of introducing insights into the code base.

Code Pane 210 shows content of a file from the code base, as selected in the File Pane 220. Code Pane 210 shows a file with three functions, Functions 230, 240, 250.

Function 230 appearing in lines 06-09 may comprise a code of a function "print_sentence". Above the function definition, at lines 01-05, a comment is shown. The comment provides: "Context for function print_sentence" in line 01. Line 02 provides a first insight ("Ran 321 times in past 24 h[ou]rs, takes 23 ms (30% slower in last 3d[ays])"). Lines 03-05 provide a second insight, explaining that the function is running on a server that is close to compute capacity and the implication of such insight—any code change that will significantly increase its number of invocations must take this fact into consideration. The comment may be planted in the code by a software agent (e.g., either at a server side or at the client device).

If an LLM is provided with the code, the LLM may "understand" the provided information about the function print_sentence, and process it accordingly. On the other hand, as the information is provided in a comment, it does not affect the compilation of the file.

Similarly, Function 240, appearing in lines 14-17, has a comment in lines 11-13 that is generated and introduced by a software agent, in accordance with the disclosed subject matter. The comment explains that the function print word was last invoked in the production environment 20 days ago. Hence, there's no use in altering it unless the developer also adds a new invocation of the function.

Function 250 is shown on lines 21-24. A comment appearing in lines 19-20 simply points to a file in which the information is placed. Specifically, the comment points to a specific textual file (//files/hud/additional_comments) at a specific line (234). It is noted that such a referral is also provided in a comment so it does not affect compilation. On the other hand, whenever the information and insight is updated, there's no need to change the code itself, and instead the non-code textual file is updated. The code is updated only to point to the non-code file, e.g., at the first time insights about the function are introduced, or if the location of the insights has changed.

It is noted that in some cases, a client-based software agent may be integrated into the IDE and may display to the user the insights instead of, or in addition to the comments shown at the code base. For example, lines 19-20 may be dynamically replaced for presentation purposes only, to include the insights (e.g., in a similar manner to lines 1-5). So, the software agent that is integrated into IDE 200 may replace the text for presentation purposes only, without changing the code itself, to show the actual insights instead of a referring statement.

Figure 3A:
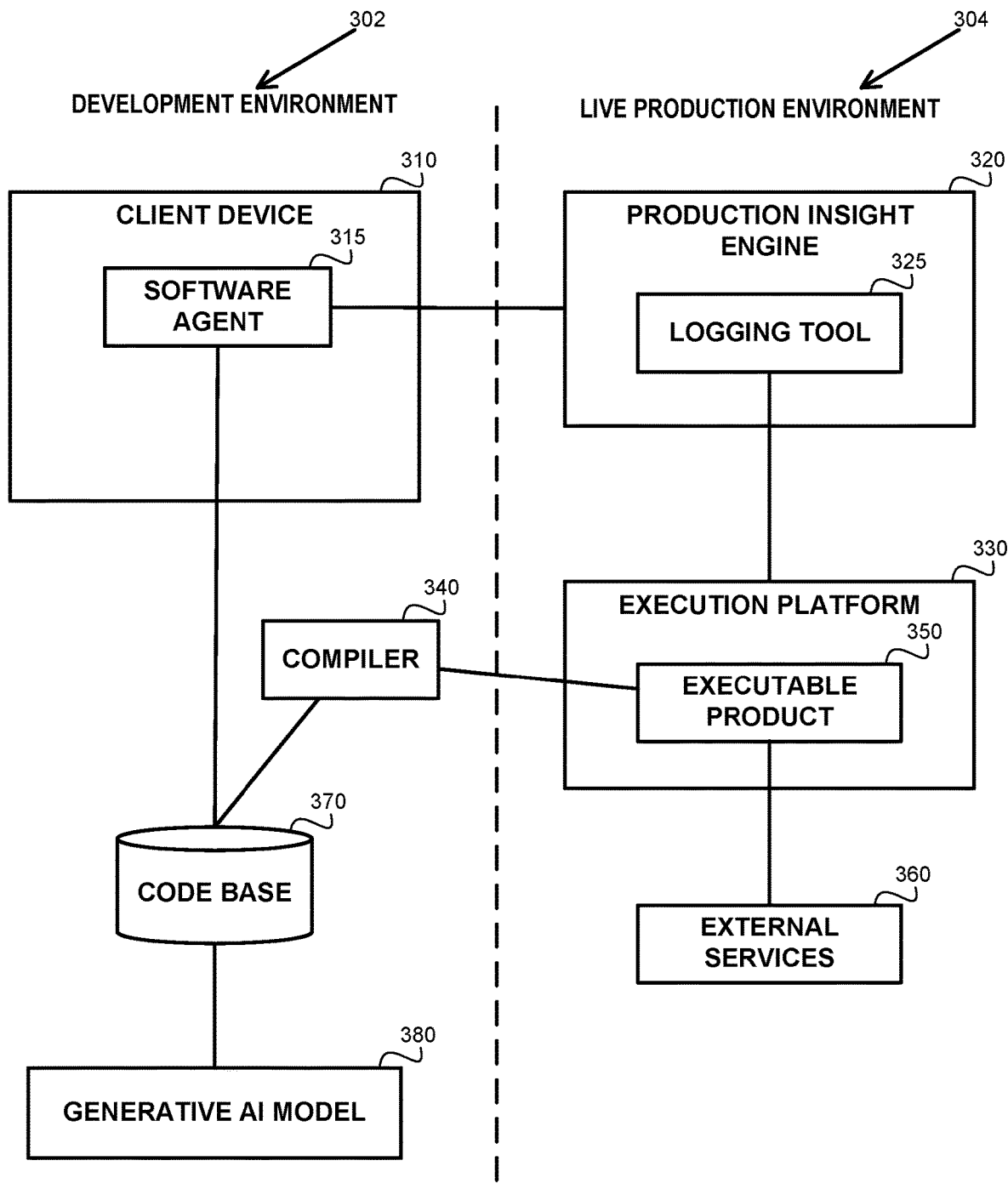
FIGS. 3A-3E show block diagrams of systems, in accordance with some exemplary embodiments of the disclosed subject matter.

Referring now to FIG. 3A showing a block diagram of a system, in accordance with some exemplary embodiments of the disclosed subject matter.

The system may be utilized for leveraging generative AI technology and real-time production insights within IDEs. The system encompasses two environments: a Development Environment 302 and a Live Production Environment 304. Development Environment 302 may be a controlled and isolated computing environment dedicated for software development, testing, and debugging purposes. Development Environment 302 may provide a space where software developers and engineers can create, modify, and optimize code, applications, or software solutions. Live Production Environment 304 may be an actual operational environment where the finalized and tested software, applications, or systems are deployed and made available to end-users.

Live Production Environment 304 may include Execution Platform 330 for executing Executable Product 350. Execution Platform 330 may be one or more server, computer nodes, processors, or the like, that are used for executing Executable Product 350. Executable Product 350 may be an outcome of a compilation of Code Base 370 or portion thereof, as compiled by Compiler 340. It is noted that as explained above, the disclosed subject matter is not limited to a compiler-based development language, and Executable Product 350 may be executable by other means, such as using an interpreter.

In some exemplary embodiments, a Production Insight Engine 320 may be deployed within Live Production Environment 304. Production Insight Engine 320 may be configured to derive production insights pertaining to code elements within a Code Base 370. Each production insight may be determined based on data derived from Live Production Environment 304, when executing Executable Product 350. The insights may comprise production information regarding various aspects of the code elements in the Code Base 370. The insights encompass a wide range of parameters, including but not limited to performance, invocation rate, costs, and cross-service interactions.

Additionally, or alternatively, Production Insight Engine 320 may be configured to derive the production insight based on a log recorded by a Logging Tool 325 configured to monitor execution of Executable Product 350 in Live Production Environment 304.

It is noted that Production Insight Engine 320 may or may not be executed by Execution Platform 330. In some cases, Logging Tool 325 may be executed by Execution Platform 330 for monitoring execution of Executable Product 350, while the modules of Production Insight Engine 320 that generate a derived insight from the monitored data may be executed on other computers.

Additionally, or alternatively, Executable Product 350 may utilize External Services 360. External Services 360 may be separate from Code Base 370, but may be called upon or used by Executable Product 350. External Services 360 may be a third-party service, platform, or software component that is accessed via APIs or other means to perform specific tasks or functionalities required by the Executable Product 350. External Services 360 may be a third-party SaaS service being called by Executable Product 350. Production Insight Engine 320 may be configured to derive insights based on data related to the interactions with these external services, such as the frequency of these calls, potential associated costs, or the like.

In some exemplary embodiments, a Software Agent 315 deployed on a Device 310, may bridge the gap between the production insights and the code development process. Software Agent 315 may be configured to automatically integrate the production insights derived by Production Insight Engine 320 into the Code Base 370. The integration may be accomplished through the addition of a text that conveys the production insights derived by Production Insight Engine 320 with respect to code elements in Code Base 370. The text may be provided in a human-readable manner and Code Base 370 may be updated to include the text in a manner that does not affect a functionality of a compiled outcome of Code Base 370 or portion thereof (e.g., Executable Product 350). It is noted that Device 310 may be a client device utilized by a developer. Additionally, or alternatively, Device 310 may be a non-user device, such as a server.

In some exemplary embodiments, a Generative AI Model 380 may be configured to be invoked for processing content of Code Base 370. Generative AI Model 380 may be deployed and implemented in Development Environment 302, by Client Device 310, by another device, such as a third-party device, or the like. Generative AI Model 380 may be configured to analyze Code Base 370 or portion thereof along with the production insight determined by Production Insight Engine 320 for generating the outcome. Generative AI Model 380 may be informed of the production insight without having an API with Software Agent 315, or with Production Insight Engine 320. Generative AI Model 380 may be configured to generate outcomes by considering the insights, enhancing the information available to the model, and therefore potentially improving its outcome. For example, in case of generated code, the additional information may be useful to improve generated code's performance, to avert potential errors, or the like.

The strategic placement of the contextual information (e.g., also referred to as structured context), within the Code Base 370 may be performed dynamically based on specific triggers, ensuring the most relevant and current insights are considered by Generative AI Model 380 during code generation. Techniques like code comments, code file headers, and separate files are employed to ensure Generative AI Model 380 automatically considers this information.

In some cases, the insights are planted in the Code Base 370 regularly. Additionally, or alternatively, the insights may be planted in Code Base 370 in response to the invocation of Generative AI Model 380.

In some exemplary embodiments, the contextual information may be inserted to Code Base 370 in a separate non-compilable textual file. Such file may be stored within Code Base 370, e.g., as a textual resource file. Software Agent 315 may be configured to introduce a comment to Code Base 370 pointing to the separate (compilable or non-compilable) textual file.

Figure 3B:
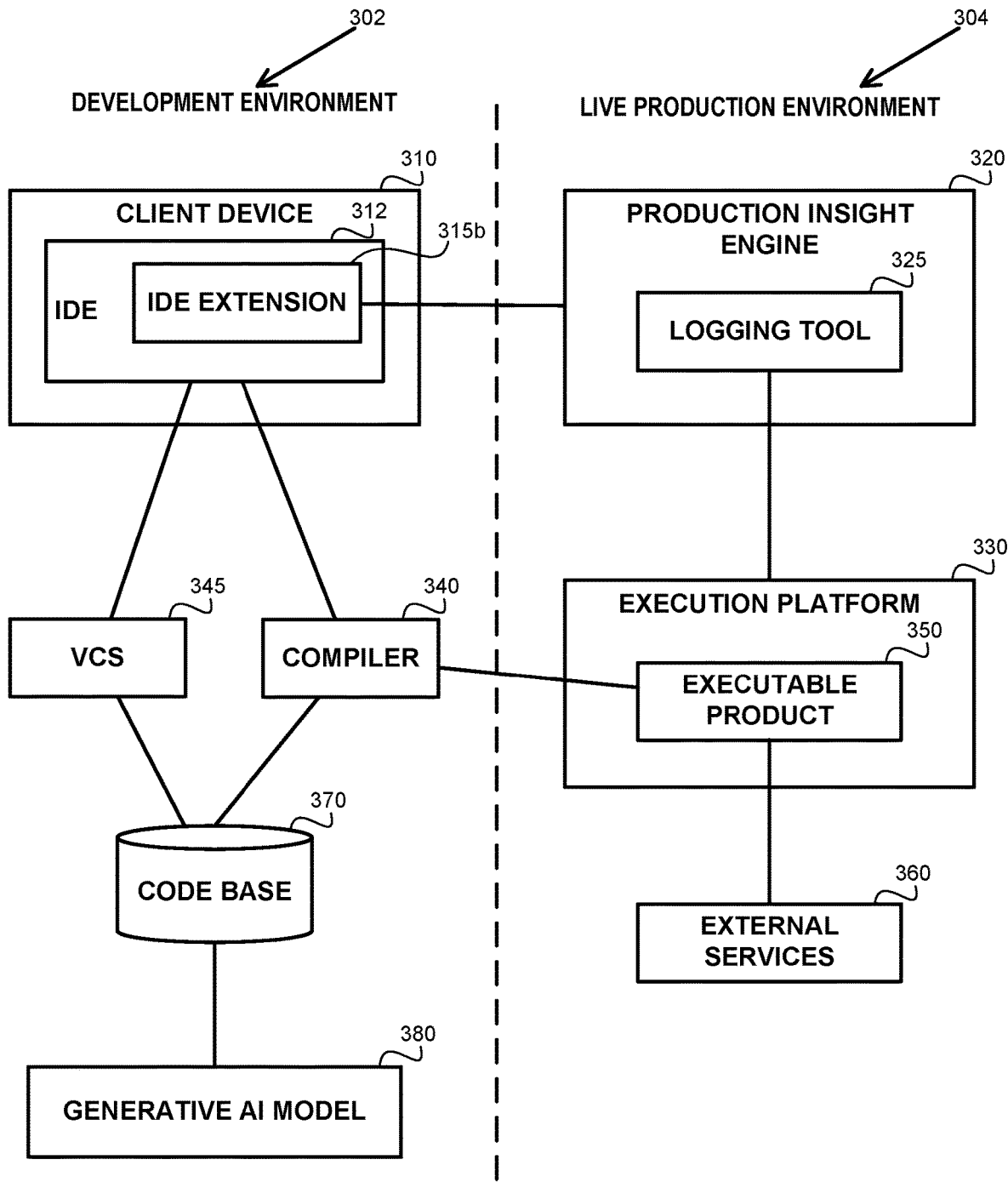

Referring now to FIG. 3B showing a block diagram of a system, in accordance with some exemplary embodiments of the disclosed subject matter.

In some exemplary embodiments, IDE Extension 315*b* may act as the Software Agent 315 within IDE 312, automatically updating the Code Base 370 with the production insights using a dedicated interface. IDE Extension 315*b* may be configured to automatically update Code Base 370 to include a text that conveys the production insights derived by Production Insight Engine 320 with respect to code elements in Code Base 370.

Additionally, or alternatively, IDE Extension 315*b* (or generally Software Agent 315) may be configured to update Code Base 370 to include text that pretains to insights that are derived from VCS 345. In some exemplary embodiments, VCS 345 may be utilized by developers to update Code Base 370. In some exemplary embodiments, updates to Code Base 370 may be performed through VCS 345. VCS 345 may retain information relating to which developer committed which code change and when. VCS 345 may retain branch and merge information. In some cases, VCS 345 may retain information about the content of each code change. In some exemplary embodiments, based on the information retained in VCS 345, insights may be derived, such as insights relating to which developer is in the original author of a code element, which developer contributed to the code element, which developer contributed the recent changes to the code element, which developer contributed to the code element code lines that relate to a specific programming aspect, which developer is currently editing or working on the code element (e.g., a developer that checked-out the file containing the code element and did not check it back in. In some cases, it may be checked whether the un-checked version has a change in the code element itself), or the like. In some exemplary embodiments, insights derived from the VCS 345 may be created and introduced into Code Base 370 to be used in accordance with the disclosed subject matter.

Figure 3C:
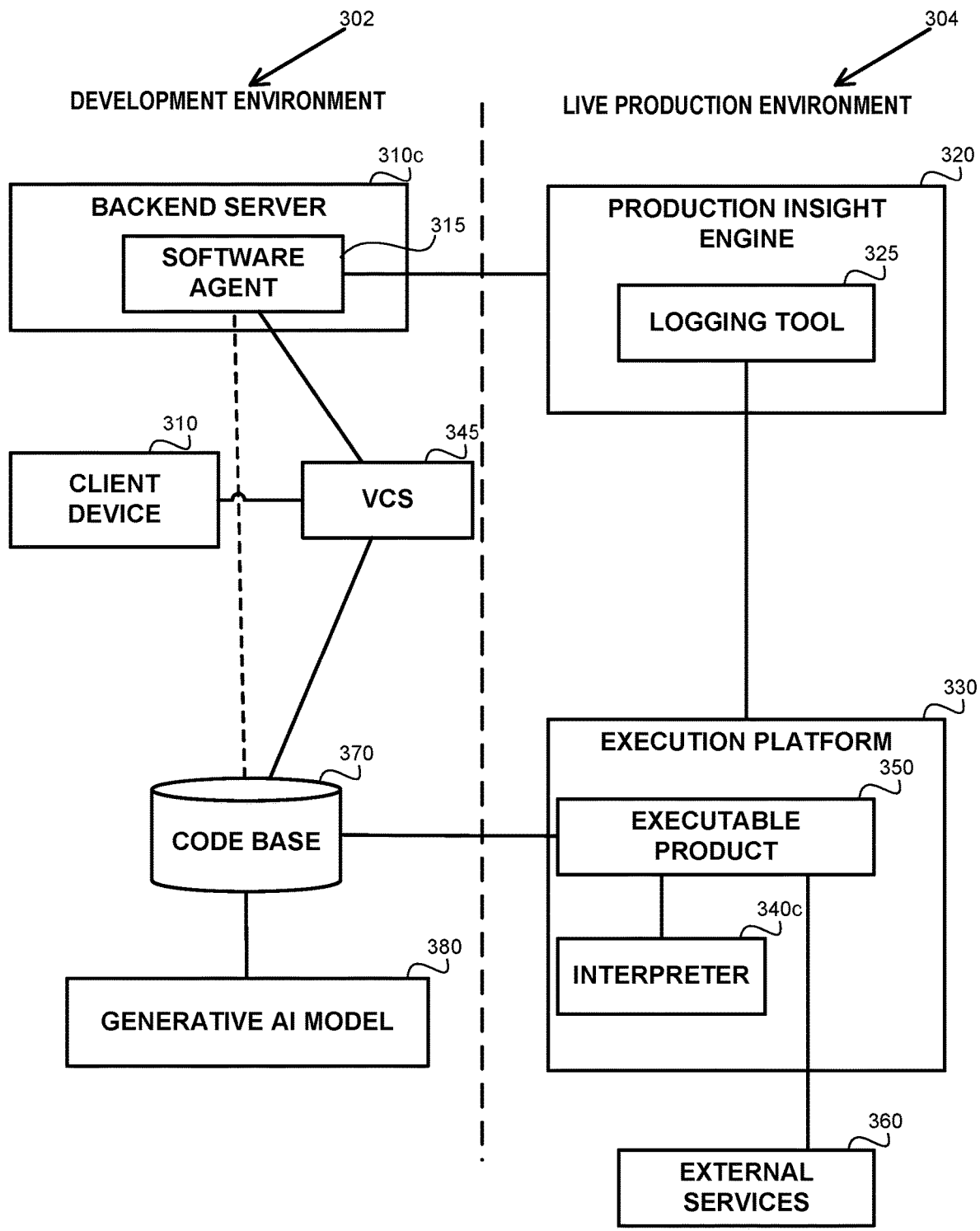

Referring now to FIG. 3C showing a block diagram of a system, in accordance with some exemplary embodiments of the disclosed subject matter.

In FIG. 3C, Software Agent 315 is shown to be executed and deployed on a Backend Server 310c. In such an embodiment, Software Agent 315 that updates Code Base 370 with insight information need not be executed by a client device (e.g., 310). Instead, Software Agent 315 is executed by Backend Server 310c, which may be, for example, a local server, a virtual server, a physical server, a cloud server, or the like. In some exemplary embodiments, Software Agent 315 may update Code Base 370 directly, such as by updating files directly in the relevant storage. Additionally, or alternatively, Software Agent 315 may update Code Base 370 indirectly, thorough VCS 345. For example, Software Agent 315 may utilize a "ghost" credentials, an API of VCS 345, or the like to update Code Base 370. In one example, VCS 345 may be GitHub™ and a GitHub™ plugin may be utilized by Software Agent 315 to update Code Base 370.

FIG. 3C also exemplifies that Executable Product 350 can be a non-compiled computer program product, such as in case of an interpreter-based language such as JavaScript™ and Phyton™. In such a case, Executable Product 350 may be deployed by copying it from Code Base 370 to Execution Platform 330. Execution Platform 330 has retained therein an Interpreter 340c that is configured to interpret and execute Executable Product 350.

Figure 3D:
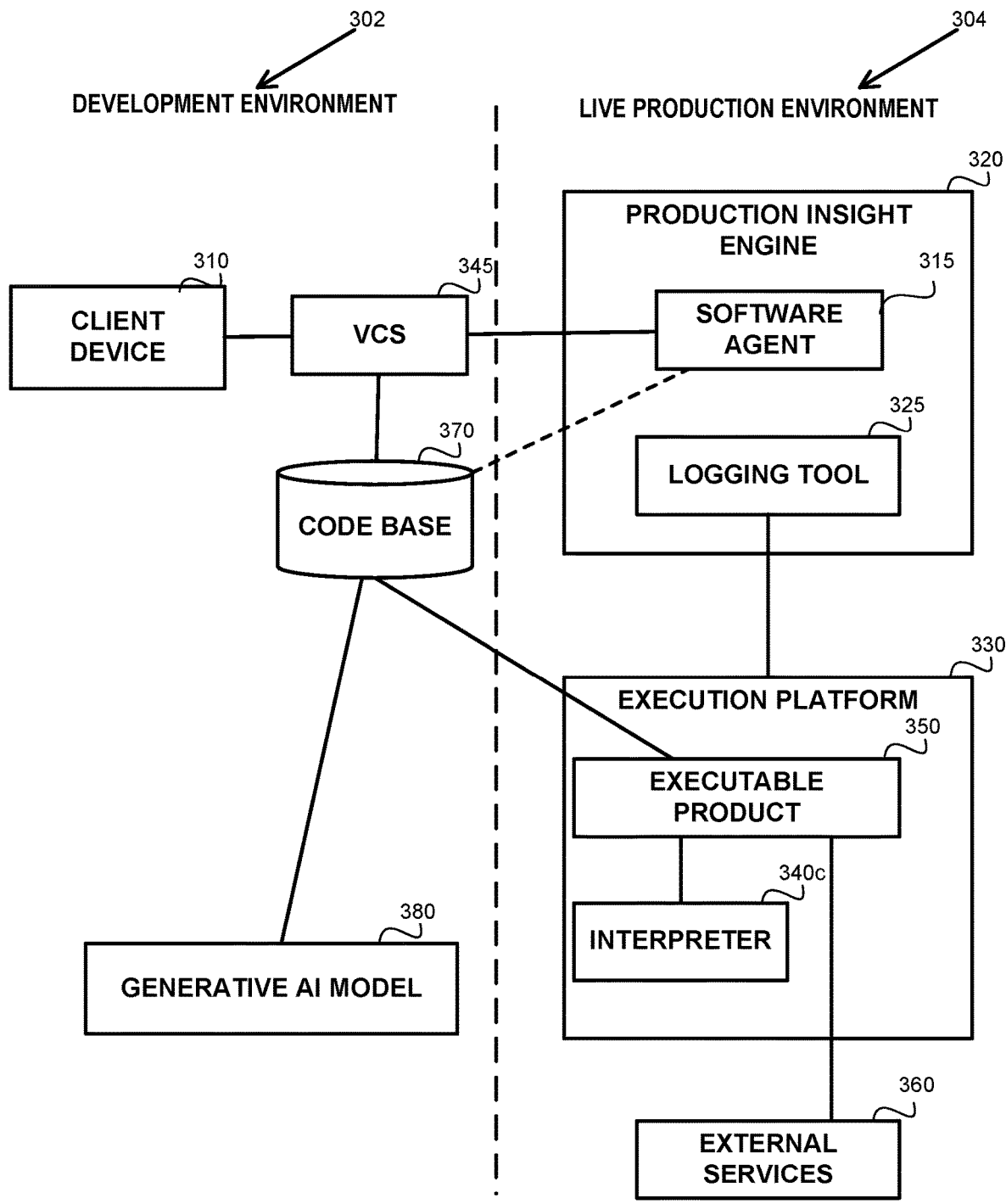

FIG. 3D shows another block diagram of a system, in accordance with some exemplary embodiments of the disclosed subject matter. In FIG. 3D, Software Agent 315 is deployed directly as part of Production Insight Engine 320 and is configured to update Code Base 370 (directly, or indirectly, e.g., through VCS 345) from Live Production Environment 304.

Figure 3E:
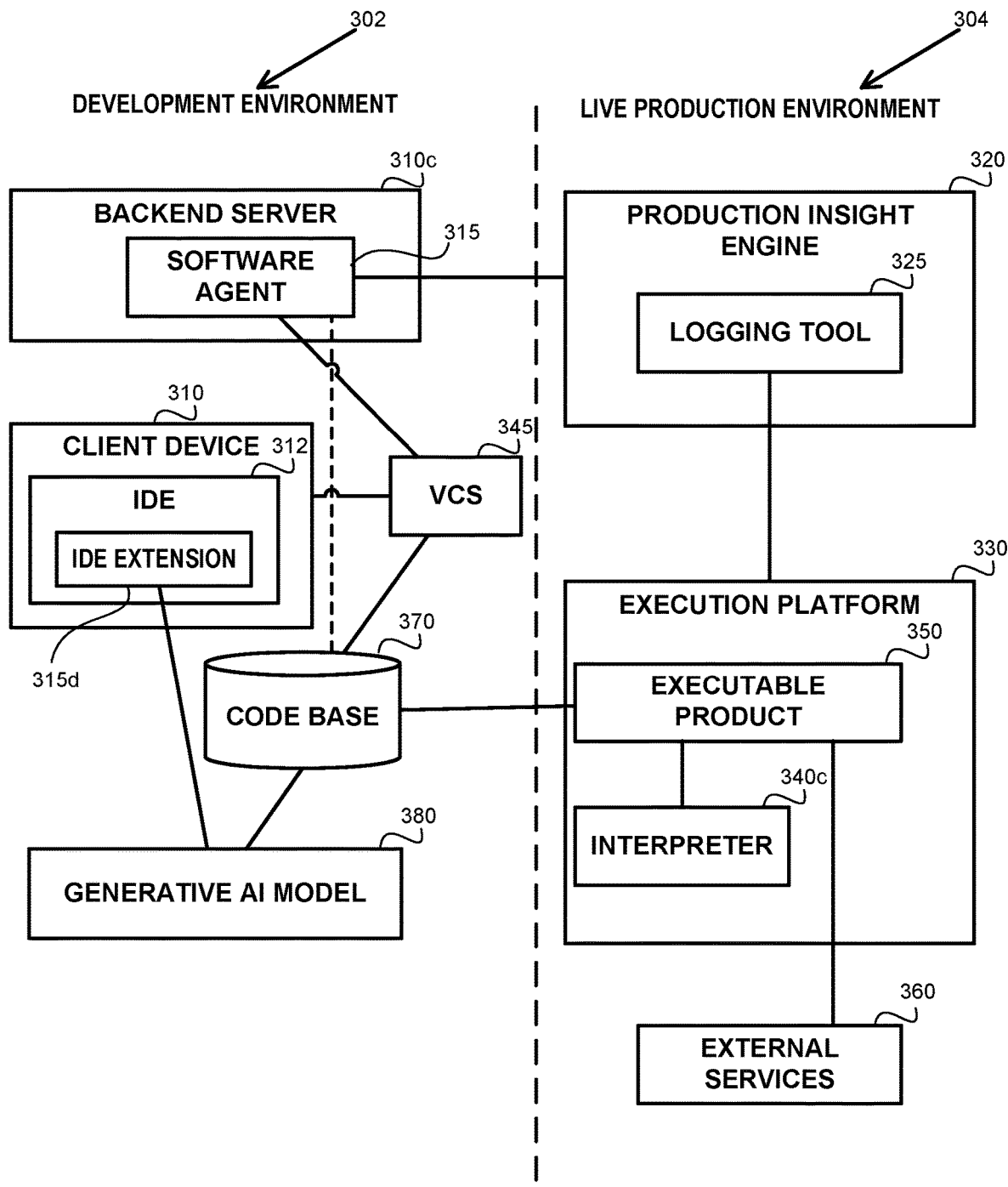

Referring now to FIG. 3E showing a block diagram of a system, in accordance with some exemplary embodiments of the disclosed subject matter. FIG. 3E exemplifies an embodiment in which Generative AI Model 380 is invoked directly through the use of API. In some cases, an API of the Generative AI Model 380 may be utilized to invoke the execution of the model. In one example, the API may allow IDE 312 to cause Generative AI Model 380 to start processing Code Base 370 or portion thereof. IDE 312 may do so through its original functionality, or through the use of an extension (e.g., 315d). As an example, the developer may utilize a GUI of IDE 312 to provide a prompt, such as "Does function func_name work properly?", "Suggest code change to improve performance of the program", "Improve stability of function func_name", or the like. The prompt may be sent to Generative AI Model 380 together with a reference to or a copy of the relevant portion of the code in Code Base 370. In some cases, the entire Code Base 370 may be made available to Generative AI Model 380. The insights may be available to Generative AI Model 380 as text conveying the insights may be included in Code Base 370.

Additionally, or alternatively, Generative AI Model 380 may utilize an API to request additional information from IDE 312. For example, callback functions may be employed to request additional information, such as additional insights about a specific code element. As an example, Generative AI Model 380 may process the code without reviewing insights. Generative AI Model 380 may determine that insights about a specific set of functions is required. Accordingly, Generative AI Model 380 may send a request to IDE 312 to provide the desired insights. In some cases, Generative AI Model 380 may indicate the code elements of interest. Additionally, or alternatively, Generative AI Model 380 may indicate a type of insight of interest (e.g., error rate, invocation rate, estimated cost, or the like). In some cases, some of the insights may be made available to Generative AI Model 380 by being included directly in Code Base 370, while others may be made available through explicit request.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random-access memory (RAM), a read-only memory (ROM), an erasable programmable read-only memory (EPROM or Flash memory), a static random access memory (SRAM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Local Area Network (LAN), and a Wide Area Network (WAN). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, aspect oriented programming language, procedural programming language, or the like. The computer readable program instructions may execute entirely on the user's computer, partly on the user's computer, as a stand-alone software package, partly on the user's computer and partly on a remote computer or entirely on the remote computer or server. The remote computer may be connected to the user's computer through any type of network, including a LAN, a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments.

What is claimed is:

1. A method comprising:
   obtaining, by a software agent, a production insight pertaining to a code element within a code base, the production insight is determined based on data derived from a live production environment, wherein the live production environment hosts a computer program product that is an executable program that is based on the code base or portion thereof;
   automatically updating, by the software agent, the code base to include a text that conveys the production insight with respect to the code element in a human-readable manner, wherein the code base is updated to include the text in a manner that does not affect a functionality of the executable program; and
   in response to a user instruction, invoking a generative Artificial Intelligence (AI) model to generate an outcome, whereby the generative AI model is configured to analyze the code base or portion thereof and is enabled to utilize the production insight, whereby the generative AI model is informed of the production insight without having an Application Programming Interface (API) with the software agent.

2. The method of claim 1 further comprises:
   obtaining, by the software agent, a second production insight pertaining to the code element, the second production insight is determined based on second data that is derived from the live production environment earlier than a time at which the data is derived, the second production insight contradicts the production insight; and
   in response to said obtaining the second production insight, automatically updating the code base to include a second text that conveys the second production insight with respect to the code element in a human-readable manner;
   wherein said automatically updating the code base to include the text comprises updating the code base to remove the second text;
   whereby real-time up-to-date production insights are maintained in a human-readable manner within the code base.

3. The method of claim 1, wherein the software agent is configured to cause an Integrated Development Environment (IDE) to update the code base based on production insights made available thereto, whereby said automatically updating is performed by the IDE.

4. The method of claim 1, wherein the code element is a function, whereby production insights are provided in a function-level granularity.

5. The method of claim 1, wherein the production insight comprises at least one of:
an error rate metric indicating an error rate of the code element when executed in the live production environment;
an execution time metric indicating an execution time of the code element when executed in the live production environment;
an invocation frequency metric indicating an invocation frequency of the code element in the live production environment; and
a resource utilization metric indicating utilization of third-party resources by the code element when executed in the live production environment.

6. The method of claim 1, wherein the software agent is further configured to update the code base by including a second text pertaining to a second insight regarding the code element, wherein the second insight is a non-production insight.

7. The method of claim 1, wherein the software agent is further configured to update the code base by including a second text pertaining to a second insight regarding the code element, wherein the second insight is derived from a Version Control System (VCS) that is utilized by developers updating the code base.

8. The method of claim 1, wherein the text is inserted to the code base as a comment, wherein a compiler or interpreter processing the code base is configured to ignore the comment.

9. The method of claim 1, wherein the text is inserted to the code base in a separate textual file.

10. The method of claim 9, wherein said automatically updating comprises introducing a comment to the code base pointing to the separate textual file.

11. The method of claim 9, wherein said automatically updating comprises introducing a pre-processing directive instructing an inclusion of content of the separate textual file, the separate textual file is a dedicated code file including only comments that convey insights regarding code elements.

12. The method of claim 1, wherein the generative AI model is a Large Language Model (LLM).

13. The method of claim 1, wherein the generative AI model is invoked independently of software agent and without involvement thereof.

14. The method of claim 1, wherein the generative AI model is invoked to perform at least one of:
generate a summary of the code element;
debug the code base;
code a new feature into the code base;
update the code base to improve performance of the computer program product in the live production environment; and
provide a suggestion regarding code optimization of the code base,
performance improvement or debugging the code base.

15. The method of claim 1, wherein said obtaining the production insight comprises:
obtaining from a logging tool information regarding execution of the computer program product, the logging tool is executed in the live production environment and is configured to monitor execution of the computer program product;
deriving the production insight from the information obtained from the logging tool.

16. A system comprising:
a production insight engine comprising a processor and a memory, wherein said production insight engine is deployed at a live production environment, said production insight engine is configured to derive a production insight pertaining to a code element within a code base, the production insight is determined based on data derived from the live production environment, wherein the live production environment hosts a computer program product that is an executable program that is based on the code base or portion thereof;
a software agent that is deployed on a client device, said software agent is configured to automatically update the code base to include a text that conveys the production insight with respect to the code element in a human-readable manner, wherein the code base is updated to include the text in a manner that does not affect a functionality of the executable program; and
a generative Artificial Intelligence (AI) model, said generative AI model is configured to generate an outcome in response to a user instruction, wherein the generative AI model is configured to analyze the code base or portion thereof and is enabled to utilize the production insight for generating the outcome, whereby the generative AI model is informed of the production insight without having an Application Programming Interface (API) with said software agent or with said production insight engine.

17. The system of claim 16 further comprises an Integrated Development Environment (IDE) that is utilized by a user using the client device, wherein said software agent is an IDE extension, whereby said automatically updating is performed by the IDE.

18. The system of claim 16 further comprises a Version Control System (VCS), said VCS is utilized by developers updating the code base, wherein said software agent is configured to update the code base by including a second text pertaining to a second insight regarding the code element, wherein the second insight is derived from said Version Control System (VCS).

19. The system of claim 16, wherein the text is inserted to the code base in a separate textual file, wherein said agent is configured to introduce a comment to the code base pointing to the separate textual file.

20. The system of claim 16, wherein said production insight engine comprises a logging tool, said logging tool is executed in the live production environment and is configured to monitor execution of the computer program product, wherein said production insight engine is configured to derive the production insight based on a log recorded by said logging tool.

21. A computer program product comprising a non-transitory computer readable medium retaining program instruction, which program instructions when read by a processor, cause the processor to:
obtain a production insight pertaining to a code element within a code base, the production insight is determined based on data derived from a live production environment, wherein the live production environment hosts a computer program product that is an executable program that is based on the code base or portion thereof;
automatically update the code base to include a text that conveys the production insight with respect to the code element in a human-readable manner, wherein the code base is updated to include the text in a manner that does not affect a functionality of the executable program; and in response to a user instruction, invoking a generative Artificial Intelligence (AI) model to generate an outcome, whereby the generative AI model is configured to analyze the code base or portion thereof and is enabled to utilize the production insight, whereby the generative AI model is informed of the production insight without utilizing an Application Programming Interface (API).

\* \* \* \* \*